SHEAR BLADE GRINDING MACHINE
Filed Oct. 21, 1965
3 Sheets-Sheet 1
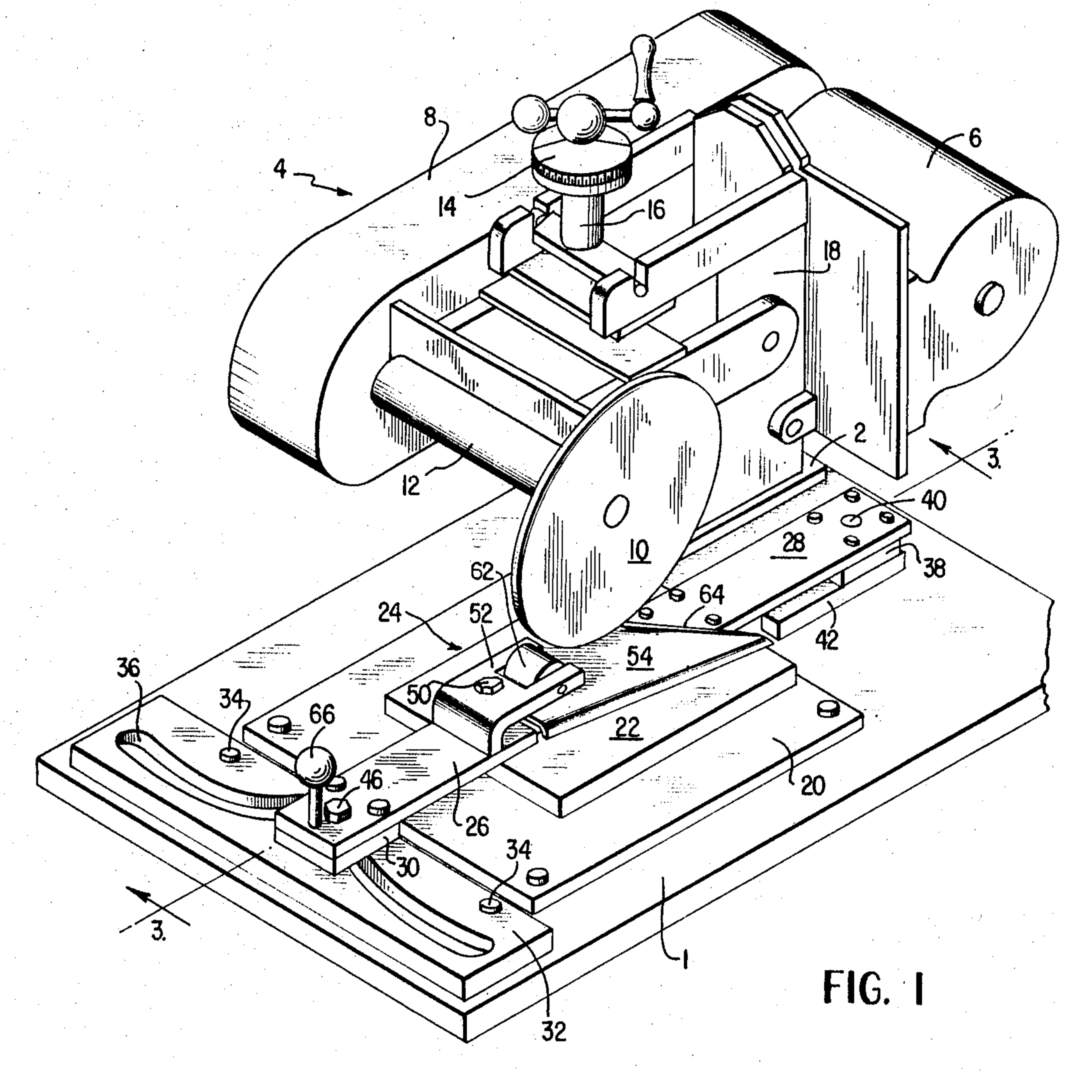
FIG. 1
FIG. 2
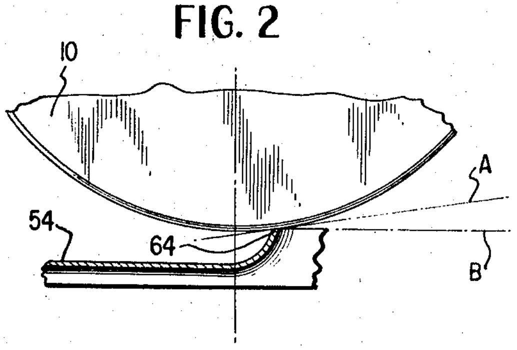
INVENTOR.
FRANCIS J. GARVEY
BY Albert H. Kirchner
ATTORNEY INVENTOR.
FRANCIS J. GARVEY
BY Albert H. Kirchner
ATTORNEY

INVENTOR
FRANCIS J. GARVEY

BY Albert H. Kirchner

ATTORNEY

United States Patent Office 3,368,310
Patented Feb. 13, 1968

1

2

3,368,310

SHEAR BLADE GRINDING MACHINE

Francis J. Garvey, Newfield, N.J., assignor to Garvey Products Corporation, Blue Anchor, N.J., a corporation of New Jersey Filed Oct. 21, 1965, Ser. No. 499,959
14 Claims. (Cl. 51—100)

The present invention relates to shear blade grinding machines and particularly to apparatus for sharpening such blades as are used in cutting gobs of molten glass in connection with molding and similar operations involving the supply of molten glass in measured quantities that must be cut off from a pouring source.

The machine provided by the present invention, however, is not limited to use in connection with the blades of the glass industry but will be found advantageous for grinding the edges of cutting blades generally, particularly such as are formed along flat angular or curved lines.

In the specific example adopted in this application for Letters Patent to illustrate the invention, the blade edge is of flat V-shape, and a particular object of the invention is to provide a machine including essentially a grinding wheel and a blade holder so disposed and releated that the wheel and a blade fixed in the holder will, during operative rotation of the wheel, be movable relatively to each other in such a fashion that the point of grinding impingement of the wheel on the blade will move accurately along the edge to be sharpened and will provide such edge with a cutting surface formed along an accurately predetermined line, producing, if desired, an edge of uniform predetermined rake all along an edge line that may be angular or curved in plan.

A more specific object is to provide such a machine in the form of a fixed bed having a mounting for a power driven grinding wheel that, while preliminarily adjustable, is normally maintained in fixed position during the grinding operation, and having a mounting for a blade that is movable relatively to the wheel so as to bring points along the blade edge successively into grinding contact with the wheel.

A still more specific object is to provide a machine of the character indicated in which the movement of the blade is predetermined by a profile cam which corresponds to the contour or plan curvature or angularity of the blade cutting edge and which is removable and replaceable to accommodate blades of different size and cutting edge design.

A further object is to provide a blade grinding machine that is controlled in semi-automatic manner by a cam profile that is easily generated to accommodate any blade having a cutting edge of V- or U-shape, regardless of its specific angularity or curvature.

A related object is to provide a machine of the character described with an attachment for generating a cam profile directly and empirically from any blade that is to be ground, so that it becomes a simple and easy matter to provide a given machine with a set of cam profiles that are readily interchangeable for use with all the blades, of whatever edge shape, that may require sharpening from time to time.

A similarly related object is to provide a machine of the character indicated with an attachment, usable optionally, for dressing the grinding wheel to a peripheral contour of a profile predetermined by removable, replaceable and interchangeable patterns—all in attainment of the basic purpose of making the complete machine versatile for operation on blades of a wide variety of shapes, dimensions, edge angles or curvature, etc.

The foregoing and other objects and advantages are accomplished by the machine illustrated in the accompanying drawings which depict a preferred embodiment of the invention that has been found entirely satisfactory in actual use and which is accordingly preferred, and in which:

FIGURE 1 is a perspective view of the complete machine, with the grinding wheel guard removed;

FIG. 2 is a detail elevational view showing the engagement of the griding wheel with the blade to be ground, illustrating grinding a predetermined degree of edge rake;

Figures 5, 6, 7, 8, 9, 10:
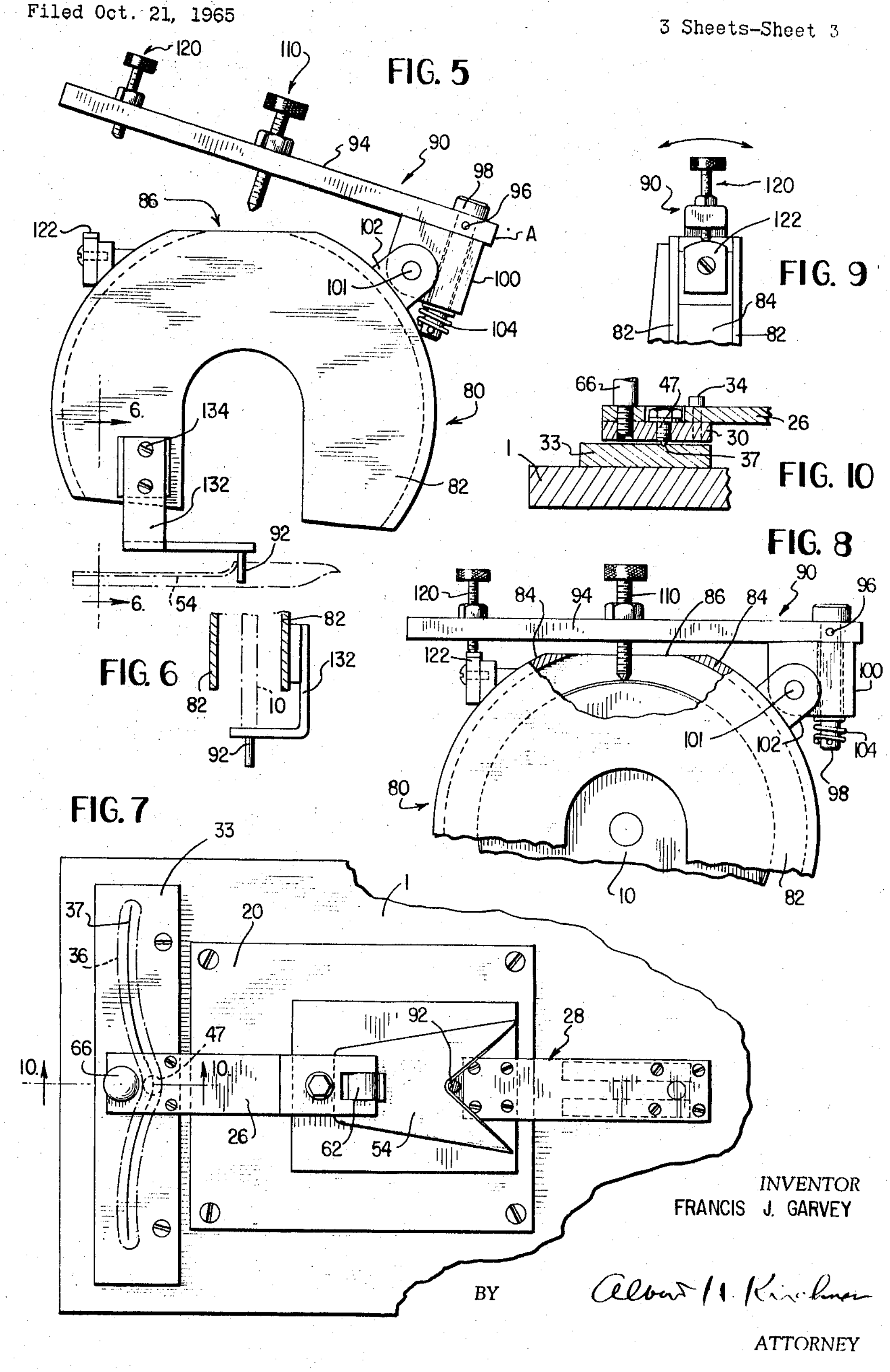
FIG. 5 is a detail side elevational view of the grinding wheel guard with template guide pin and wheel dresser assembly attached.
FIGURE 6 is a vertical sectional detail view, taken on the line 6—6 of FIG. 5 showing the relationship of the template guide pin with the position from which the grinding wheel (shown in broken lines) has been removed, during the operation of generating a new cam profile.
FIG. 7 is a horizontal sectional view taken through the template guide pin looking down on the bed of the machine showing the manner in which a new cam profile is scribed.
FIG. 8 is a detail side elevational view of the grinding wheel guard showing the wheel dresser in operation.

FIG. 9 is a detail front elevational view of the wheel dresser guide and follower; and FIG. 10 is a detail sectional view similar to the left-hand portion of FIG. 3, but showing a blank cam plate substituted for the slotted cam plate of FIG. 3 and a stylus substituted for the cam follower for the purpose of co-operating with the blank plate to scribe on it the center line of a cam slot that will later be routed into the plate.

In these drawings, the reference numeral 1 designates generally the bed of the machine, conveniently the plane surface of a metal or hardwood table top. Securely bolted or otherwise permanently and securely affixed to what will be considered the rear portion of the bed surface is a mounting plate 2 for a power driven grinding wheel assembly designated generally 4. This comprises an electric motor 6, transmission gearing, belting or the like enclosed within a housing 8, and a grinding wheel 10 on a drive shaft 12.

The assembly is substantially fixed in place on the bed so as to be stationary during operation, but means is provided for adjusting the wheel vertically, i.e., for raising and lowering it to regulate its depth of cut as will be hereinafter explained. This adjusting means may take the form of a handwheel 14 fast on a vertical shaft 16, worm and pinion or otherwise connected between the assembly 4 and the standard 18 by which the assembly is mounted on the bed; or any other well known expedient may be used for rendering the otherwise fixed wheel 10 vertically adjustable on the bed. In addition, the mounting is desirably arranged for a slight range of fore and aft adjustment of the assembly and secure fixing at selected positions prior to operation for grinding a blade.

The intermediate area of the bed 1 has a flat rectangular plate 20 bolted to it to provide a smooth surface on which rests a similar square plate 22. The latter constitutes the main body portion of a blade holder, designated generally 24 and comprising a forward extension 26 and a rear extension 28, each in the form of a bar or narrow plate bolted or otherwise rigidly secured to the plate 22.

The forward extension 26 terminates at its free, front end in a small block 30 affixed to the under side of the extension, and this block rests on an elongated plate 32 removably and replaceably secured to the bed 1 as by bolts 34 and extending transversely across the front or forward portion of the bed. The plate 32 is a profile cam member, having a cam slot 36 cut through it. As will be noted from FIGS. 1 and 4, the cam slot 36 of the illustrated embodiment of the invention comprises two arcuately curved slot portions which intersect at their communicating inner ends. As will be shown hereinafter, the machine will produce cam slots of other profiles in other plates 32 which can be substituted for the one shown when blades of different edge design from the blade of the illustrated embodiment are to be ground.

The rear extension 28 of the blade holder plate 22 has secured to its under surface a block 38 similar to the block 30, and from this block 38 depends a stout pin 40. A plate, or a pair of plates constituting together a plate means 42, is fixed to the bed 1 in its rear zone and provides a slot 44 in substantial alignment with the longitudinal center line of the bed. The pin 40 rides in this slot 44, with the block 38 resting on the plate means 42, free to slide thereon without restraint except such as is provided by the pin and slot connection.

At the forward end of the holder 24 the block 30 is provided with a depending pin 46 which rides in the cam slot 36. While this pin 46 may have the simple form of the pin 40, I prefer to form it as a short bolt standing through the extension 26 and block 30 and terminating in a precision roller that quite accurately fits the slot 36, as best shown in FIG. 3.

The rear end of the forward extension 26 is rigidly secured to the holder body plate 22 by a permanently set short bolt 48 (see FIG. 3) and a removable longer bolt 50 which serves also to fasten down on the holder plate 22 a clamp 52. It is this clamp that removably secures the shear blade 54 in position on the holder. The preferred details of the clamping arrangement are best shown in FIG. 3 and include a small block 56 fixed on the surface of the plate 22 by screws 58 countersunk up from the bottom of the plate whose top serves to provide a mounting surface for the blade. A pair of short pins or posts 60 are set in the block 56 and protrude from the upper surface of the block just far enough to stand in a pair of holes formed in the blade so as to fix the blade against shifting movement on the block. The clamp 52 has a downturned front flange that bears on the extension 26 and has pivoted at its rear end a shoe 62 which bears on the blade 54 with a pressure determined by the bolt 50. The effect, in which the pins or posts 60 and the shoe 62 cooperate, is to mount the blade securely on the block 56, and hence on the holder 24, with its cutting edge 64 rearwardly directed, as shown in the drawings.

Figure 4:
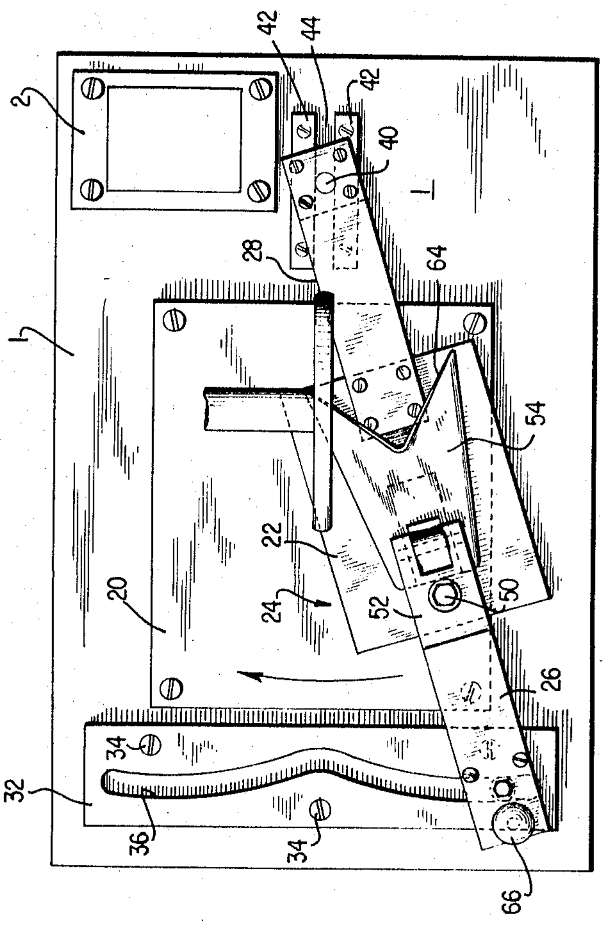
FIG. 4 is a top plan view of the bed of the machine showing, on a scale smaller than that of FIG. 3, the main structure less the grinding wheel driving means.

It will be evident that with the arrangement shown the blade holder 24, with blade 54 mounted on it, will be movable between the positions shown in FIGS. 1 and 4 in which the plate 22 slides freely on the plate 20 while the point on the blade holder rear extension 28 corresponding to the axis of the pin 40 moves longitudinally, i.e., forwardly and rearwardly, and the forward portion of the holder swings laterally as the pin 46 moves in the cam slot 36.

Figure 3:
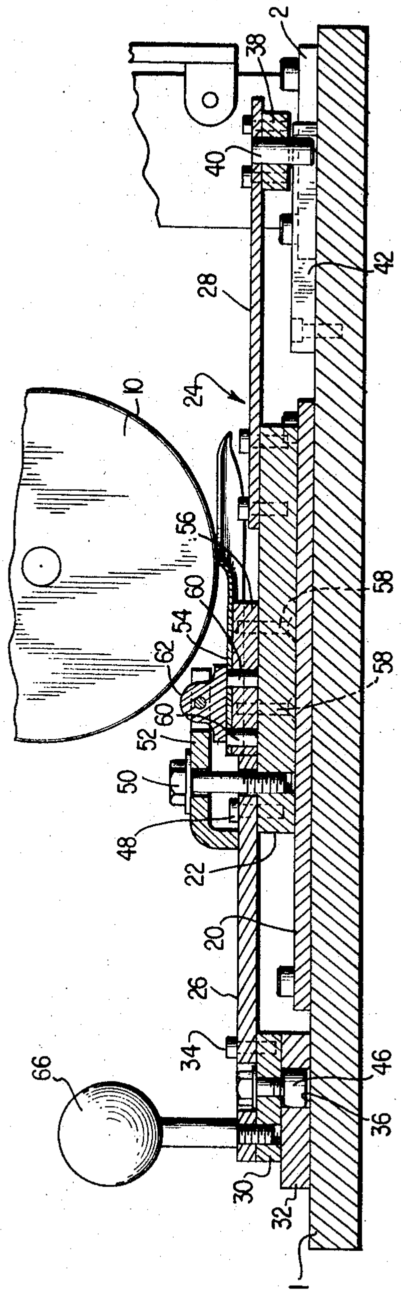
FIG. 3 is a longitudinal vertical sectional view taken on the line 3—3 of FIG. 1.

To produce this movement as desired the front end of the forward extension 26 may be provided with a knob 66 threaded into the extension and the block 30, as shown in FIG. 3.

It will be understood that the wheel assembly 4 is mounted on the bed 1 in such a position that adjustment of the means 14 will bring the grinding edge of the wheel down into operative engagement with the cutting edge of a blade 54 mounted on the holder 24.

The profile cam plate 32 is mounted on the bed 1, as by the screws 34, in such a position, and its cam slot 36 is so designed, that swinging of the blade holder 24 by movement of the follower 46 in the cam slot, and of the pin 40 in its slot 44, will cause the blade edge 64 to move with relation to the wheel edge to bring successively all points along the length of the blade edge into operative, grinding engagement with the wheel. That is to say, the shape of the cam slot 36 corresponds to the shape of the blade edge to be ground. In the illustrated embodiment of the invention the blade edge is of general V-shape, and this requires a cam slot 36 of the double arcuate curvature shown. When the cam follower is at the midpoint of the cam slot, as shown in FIG. 1, the grinding wheel is in contact with the blade edge at the vertex of the V. When the follower is near one of the ends of the slot, as shown in FIG. 4, the wheel contacts the blade edge at one of its extremities.

The blade holder 24, being unsecured to the bed 1 except by the pin 40 and cam follower 46, is readily removed from the bed, whenever desired, by simply lifting it from the bed. The massive weight of the blade holder serves to hold the holder assembly down on the bed and maintains sliding contact of the assembly with the plate 20. The blade 54 is readily removed by loosening the clamp 52.

The description thus far has been without reference to the grinding wheel cover 80 which normally encloses the top and sides of the wheel 10 but has been omitted from the showing on sheets 1 and 2 of the drawings for clarity of illustration of the working parts of the machine. In actual use this cover, which as shown in FIGS. 5, 6, 8 and 9, comprises a pair of matching side plates 82 of inverted substantial U-shape connected by curved front and rear plates 84 which are spaced apart at their tops to leave a top opening 86 in the cover, is bolted to the standard 18.

The cover 80, besides performing the usual function of protecting the operator of the machine from accidental contact with the high speed rotating grinding wheel, provildes a mounting for the grinding dresser attachment 90 and the template guide pin 92, as shown in FIG. 5.

The dresser attachment 90 is mounted permanently on the cover 80 and comprises a bar 94 which has its rear end pinned at 96 to a pivot stud 98 which is mounted in a block 100 which in turn is pivoted at 101 to a pair of parallel ears 102 outstanding from the cover 80 near its rear top portion. A spring 104 biases the bar 94 down onto the top of the block 100 but permits the bar to be swung laterally on the top of the block from the operative position shown in FIG. 8. The bar can also be lifter, about the pivot 101, to the inoperative position shown in FIG. 5.

Midway of the bar 94 there is mounted a wheel dressing element 110 of any conventional character, e.g., hardened steel, diamond pointed, etc., which is made adjustable in the bar as by the screw means shown. The location on the bar is such that when the bar is lowered to its operative position of FIG. 8, the point of the element 110 will penetrate the opening 86 in the top of the wheel guard 80 and engage the periphery of the grinding wheel 10.

The front end of the bar 94 is provided with a follower screw 120 which is adjustable like the dressing element 110. When the attachment 90 is in its operative position of FIG. 8, this follower screw engages a dresser profile cam plate 122 which is removably and replaceably mounted on the cover 82 near its front top portion, more or less symmetrical with the mounting of the ears 102. It will be evident that when the attachment is in the operative position of FIG. 8, the screws of the parts 110 and 120 may be adjusted so that the bar 94 can be swung laterally about the axis of pivot stud 98, with the point of follower screw 120 engaging the top surface of cam plate 122, and with the point of element 110 engaging the periphery of grinding wheel 10 so as to dress that periphery to exactly the same curvature of the plate 122 while the wheel rotates and the bar is swung back and forth.

When the dressing operation is completed, the attachment 90 is lifted to the temporarily inoperative position of FIG. 5 and the bar 94 is then swung laterally about the axis of pivot stud 98 to a position of more permanent inoperativeness.

It will be recognized that the foregoing operation results in dressing the grinding wheel with a radius or crown that insures accurate point contact of the wheel periphery with the edge 64 to be ground on the blade 54.

It will be further noted that by virtue of this accurate point contact and the longitudinal or front to rear adjustability of the grinding wheel axis, the edge 64 can be ground with any desired degree of rake. This is indicated in FIG. 2, where it will be observed that the point of contact of the wheel crown is slightly inset in the blade angle, i.e., slightly to the left as seen in the figure. Thus the edge is cut to a plane A, which is adjustably more or less raked relatively to the flat horizontal plane B of the blade edge.

As has been stated, the wheel guard 80 mounts also a profile pin for use in generating any desired cam slot 36 for grinding any blade 54.

This profile pin is shown at 92 in FIGS. 5, 6 and 7 and extends rigidly down from an L-shaped bracket 132 that is removably secured to the lower front portion of the outer side plate 82 of the wheel guard 80 by screws 134 and an intervening pad or shim, all so arranged that when the bracket is installed and the wheeel 10 has been removed from its shaft 12, the pin 92 will make exactly the same engagement with the edge 64 of a blade 54 mounted in the holder 24 that the periphery of the mounted wheel would make with the edge. That is to say, the mounted profile pin 92 stands directly in the median plane of the position from which the grinding wheel had been removed, as shown by FIG. 7 where the broken lines represent the position previously occupied by the grinding wheel.

To generate a cam slot 36, the wheel 10 is removed, the bracket 132 is mounted on the wheel guard 80, the blade 54 for which the new cam is to be made is installed in the holder 24, and a blank cam plate 33 is bolted down on the bed of the machine. The cam follower pin 46 is replaced by a stylus pin 47 which, as shown in FIG. 10, is identical with the pin 46 except that it is shorter and terminates in a sharp point instead of the precision roller shown in FIG. 3. The blade is then moved, by swinging the holder 24 back and forth, left and right, with the pin 92 maintained engaged with the blade edge as shown in FIG. 7. This scribes a line 37 on the surface of the blank plate 33, which line is the center line of the required cam slot. The blank is then set up in a vertical milling machine or profiller which is operated to rout out a slot of width equal to the diameter of the roller 46 and having the scribd line 37 as its center. The resulting slot 36 thus conforms to the shape of the blade edge so that the new cam plate can be installed on the bed of the machine to cause the re-installed grinding wheel to follow accurately the edge of the blade that was used in making the slot.

It is believed to be evident from the foregoing brief description of the preferred embodiment illustrated by the drawings that the invention provides a machine that accomplishes the multiple purpose of grinding the angular or curved cutting edges of shear blades, of maintaining the grinding wheel properly dressed for point contact with the edge to be ground, and of enabling pattern or guide profiles to be readily generated empirically for operation on any shape or style of blade edge.

In brief, the invention provides a versatile machine for accurately grinding shear blades having non-straightline cutting edges, for maintaining the grinding element in correct peripheral crown or contour, and for making the machine's own camming member edge-line control means for accommodating blades of various edge lines.

As has been explained hereinabove and as shown by the accompanying drawings, the grinding and cam production are accomplished by equipping the bed of the machine with a longitudinally extending blade holder for clamping the blade to be ground with its cutting edge facing inwardly of the machine and rendering it movable to swing laterally on the bed, providing an element at said inner end of the blade holder for maintaining engagement with the blade edge as the blade is moved through its path of swinging movement (which element may be the grinding wheel 10 or the template guide pin 92) and by providing a cam plate (which may be blank, about to have produced on it the line of a cam slot later to be routed into it, or may be preslotted with a cam track) on the bed adjacent the outer end of the blade holder for engagement by a tracking member (which may be a stylus pin or a cam follower pin 46) as the holder moves the blade edge through its path of movement, with means constraining movement of the clamped blade to coordinate its path of movement with the path of movement of the tracking member on the cam plate so that the blade edge engaging element will maintain contact with the edge at all times during such movement while the tracking member moves along the cam plate in a predetermined path.

In addition, the complete machine includes a wheel crown or profile dressing attachment 90 mountable on the wheel cover and having elements engageable respectively with a profile cam plate 122 and the wheel periphery to dress the periphery to exactly the predetermined profile of the cam plate.

It is to be understood that this disclosure is made by way of exemplification of the invention and not limitation to the particular details of the mechanism shown. On the contrary, the invention may be otherwise embodied, with variations in the arrangements shown. Not all of the combinations of parts and features need be used together, but all such other embodiments and variations, to the extent that they are within the scope of the more broadly worded of the appended claims, are to be deemed within the scope and purview thereof.

I claim:

1. A grinding machine for a shear blade having a cutting edge of non-straightline shape comprising a supporting bed, a blade holder extending substantially longitudinally of said bed for clamping a blade to be ground with its cutting edge facing inwardly of the machine, means mounting said blade holder for swinging movement laterally on the bed, an element mounted above the bed and extending down into engagement with the cutting edge of a blade in the holder, a cam plate mounted on the bed adjacent the outer end of the holder, a tracking member carried by the outer end of the holder and engaged with the cam plate during swinging movement of the holder, and inter-engaged elements formed on the inner end of the holder and the adjacent portion of the bed of the machine constraining the swinging movement of the holder to a path in which the cutting edge engaging element is maintained engaged with the cutting edge of the blade and the tracking member is maintained in a predetermined path on the cam plate corresponding to the shape of the shear blade edge.

2. A grinding machine as claimed in claim 1 in which the cutting edge engaging element is a grinding wheel rotatable to grind the edge of the blade.

3. A grinding machine as claimed in claim 1 in which the cutting edge engaging element is a template guide pin.

4. A grinding machine as claimed in claim 1 in which the cutting edge engaging element is a grinding wheel rotatable to grind the edge of the blade and the tracking member is a cam follower engaged with a cam surface of the cam plate.

5. A grinding machine as claimed in claim 1 in which the cutting edge engaging element is a template guide pin and the tracking member is a stylus cooperating with a blank cam plate for scribing a cam line thereon.

6. A grinding machine as claimed in claim 1 in which the cutting edge engaging element is a grinding wheel rotatable to grind the edge of the blade, and including a wheel covering enclosing a side of the wheel and having a top opening, in combination with a wheel dresser attachment comprising a bar having a rear end pivoted on the upper rear portion of the cover for lateral swinging, a dresser tool mounted on an intermediate portion of the bar and extendible through said opening into engagement with the wheel periphery, a wheel periphery contour profile cam plate mounted on the upper front portion of the cover, and a cam follower mounted on the front end portion of the bar and engaged with the cam plate during lateral swinging of the bar to determine the contour dressing of the wheel periphery.

7. A shear blade grinding machine comprising a supporting bed having a profile cam extending generally transversely across its front portion, a shear blade holder extending generally longitudinally on said bed having blade-holding means at its intermediate portion and having at its front a cam follower cooperatively engaged with said cam and having at a point near its rear end a pin engaged in a slot in said bed and cooperating with the cam and follower to constrain the holder to a sliding movement on the bed with said point moving in a longitudinal path and the front of the holder swinging through a lateral path, and a driven rotary grinding wheel mounted on the bed in operatively fixed position above a blade held by the holder for engaging in grinding relation the cutting edge thereof and maintaining said engagement as the blade moves laterally and longitudinally consequent upon said sliding movement of the holder.

8. A shear blade grinding machine as claimed in claim 7, in which the profile cam is a slot formed in the bed and the cam follower is a pin depending from the holder and riding in said slot.

9. A shear blade grinding machine as claimed in claim 7, in which the profile cam is a slot formed in the bed comprising two arcuate curves intersecting at the midpoint of the slot.

10. A shear blade grinding machine as claimed in claim 7, in which the front of the holder is provided with an upstanding knob for manually moving the holder follower along the profile cam.

11. A shear blade grinding machine as claimed in claim 7, in which the grinding wheel is vertically adjustable for regulating the depth of cut of the blade edge.

12. A shear blade grinding machine as claimed in claim 7, in which the bed has a flat surface, the profile cam comprises plate means secured to said surface and provided with a pair of substantially identical arcuate slots intersecting and communicating with each other at their inner ends, the pin-engaged slot is provided in plate means secured to the surface of the bed, a third plate means is secured to the bed between said two plate means, and the blade holder comprises a plate slidably resting on said third plate means and provided with a blade-gripping device for mounting a blade on said third plate means and with a forward extension carrying said cam follower and a rear extension carrying said pin.

13. A shear blade grinding machine as claimed in claim 12, in which the blade holder is connected to the bed solely by engagement of the follower and the pin in their respective slots, so that the holder is free to be lifted for removal for replacement of a blade.

14. A shear blade grinding machine as claimed in claim 7, in which the profile cam comprises a slotted metal plate removably secured to the bed of the machine, the shear blade holder comprises a longitudinally elongated assembly of main central body slidably mounted on the bed and provided with upstanding posts for entering holes in the shear blade and mounting it on the body and having a pair of extensions projecting respectively forwardly and rearwardly from the body, each of said extensions comprising a relatively narrow plate having a pin depending from its outer end portion, the forward extension pin cooperating with the profile cam as a follower thereof and the rear extension pin being slidably and pivotally received in a slot provided on the rear portion of the bed, a clamp being provided on the body of the holder and adapted to hold a shear blade down on the body with its cutting edge disposed rearwardly for engagement by the griding wheel.

References Cited

UNITED STATES PATENTS

| | | | |
|---|---|---|---|
| 2,128,762 | 8/1938 | Weed | 51—94 |
| 2,246,023 | 6/1941 | Spurling | 51—100 |
| 2,331,381 | 10/1943 | Ekstedt | 51—100 |
| 2,891,358 | 6/1959 | Auman | 51—100 |
| 3,099,903 | 8/1963 | Crile | 51—94 |

LESTER M. SWINGLE, *Primary Examiner.*

D. G. KELLY, *Assistant Examiner.*